Nov. 23, 1954
C. E. KILBOURNE
2,695,368
DYNAMOELECTRIC MACHINE STATOR WINDING
WITH FLUID-COOLING PASSAGES
IN CONDUCTOR BARS
Filed Jan. 27, 1953
7 Sheets—Sheet 3
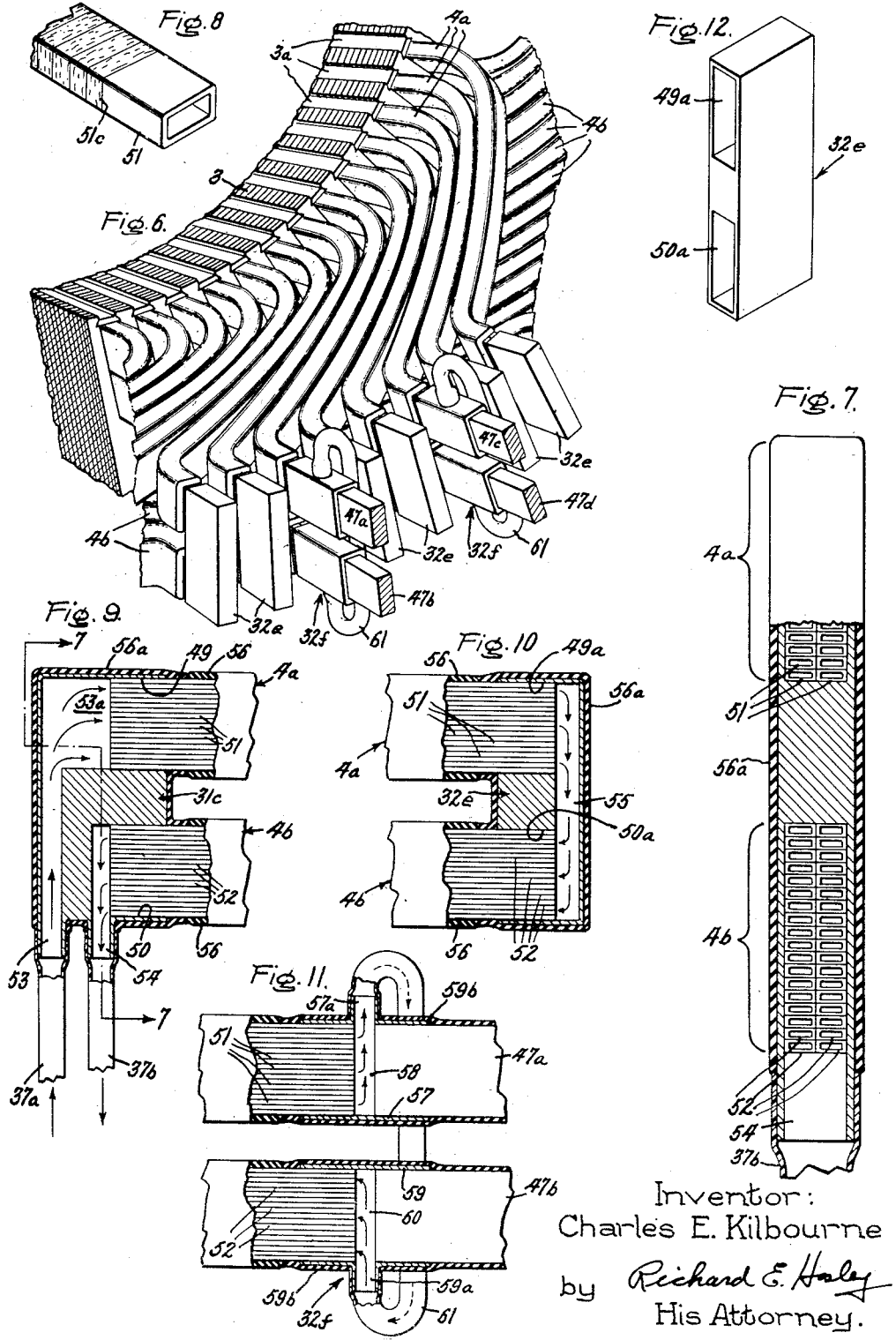
Inventor:
Charles E. Kilbourne
by Richard E. Haley
His Attorney.

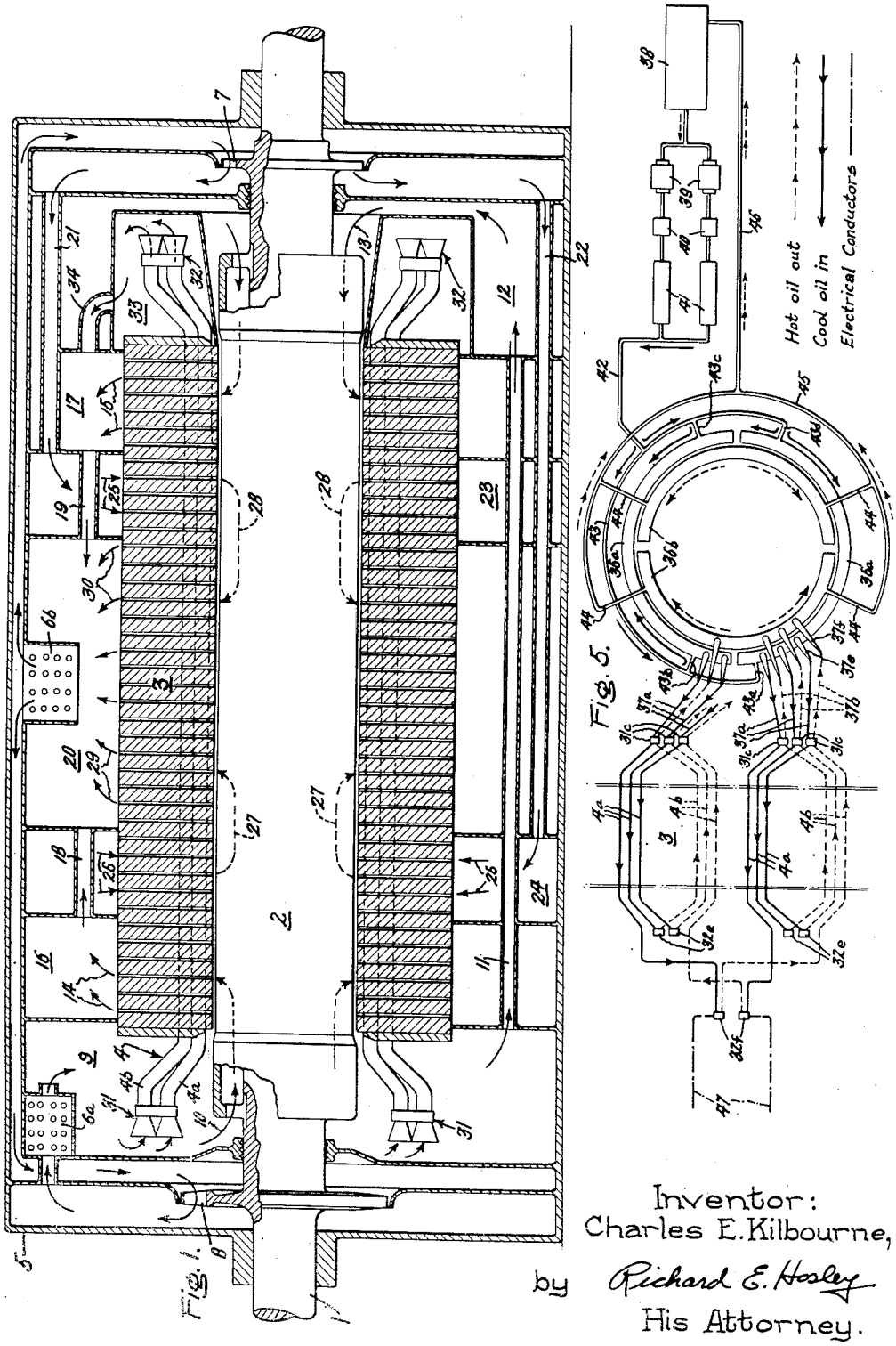
Inventor:
Charles E. Kilbourne,
by Richard E. Hosley
His Attorney.

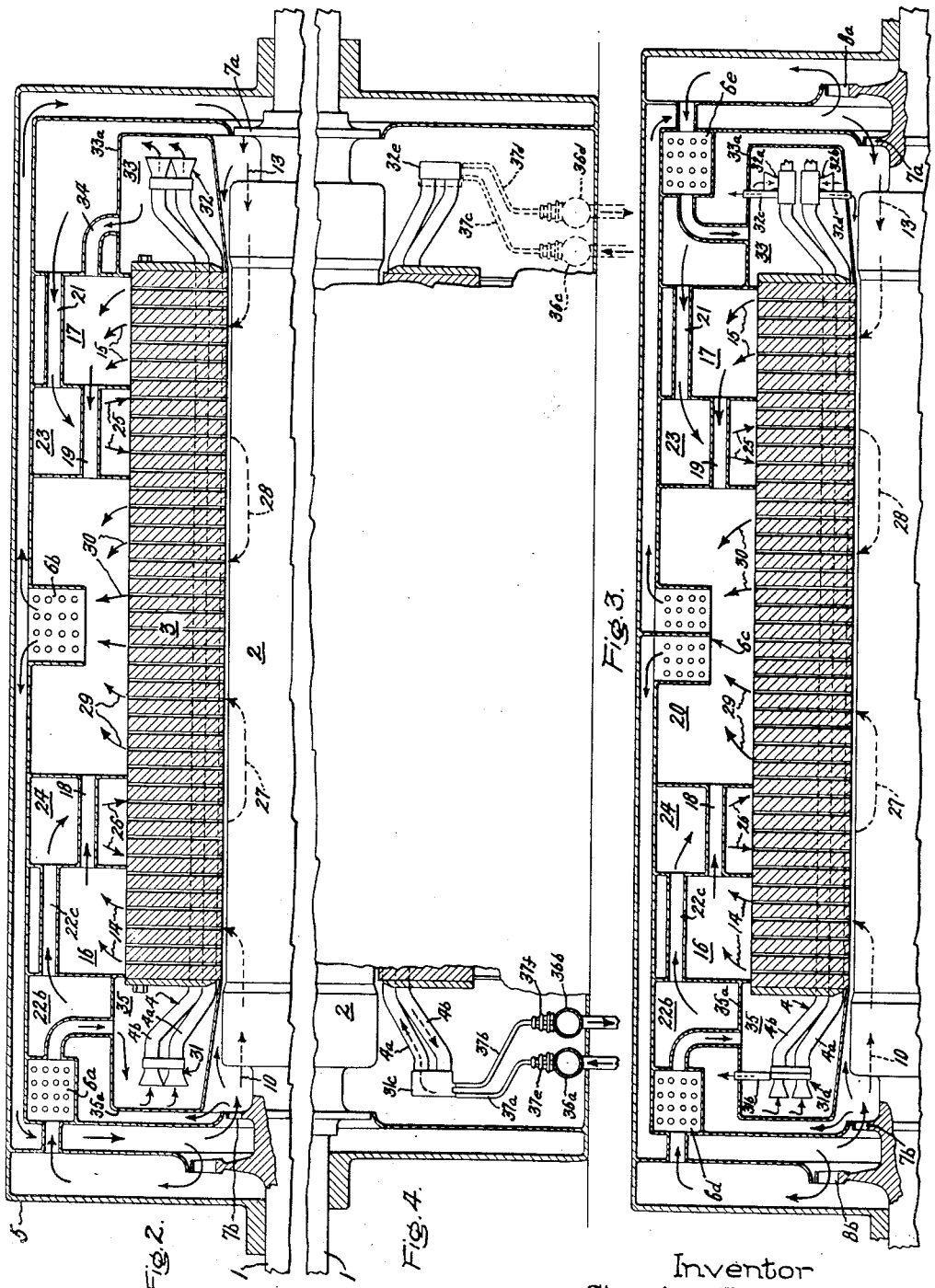

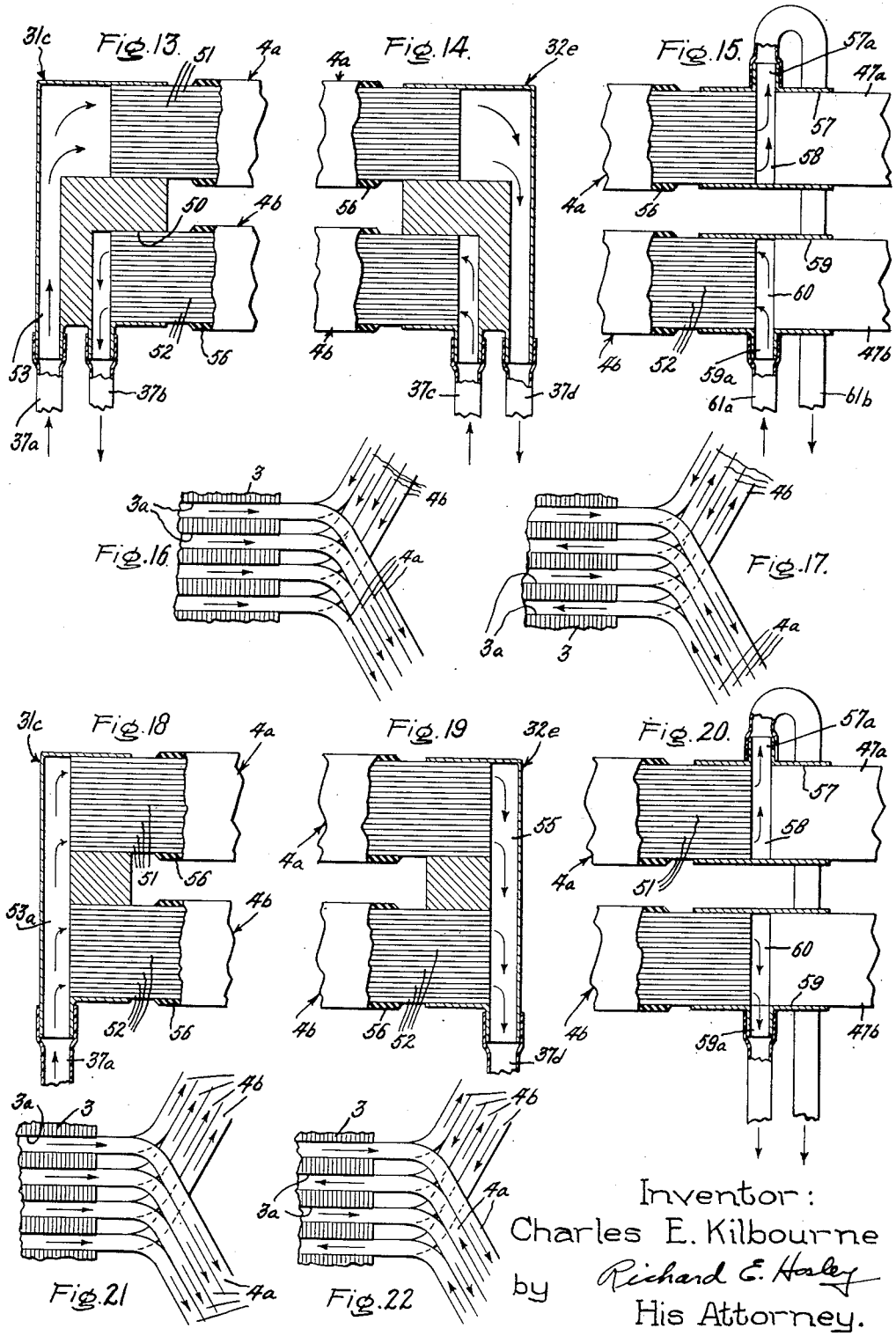

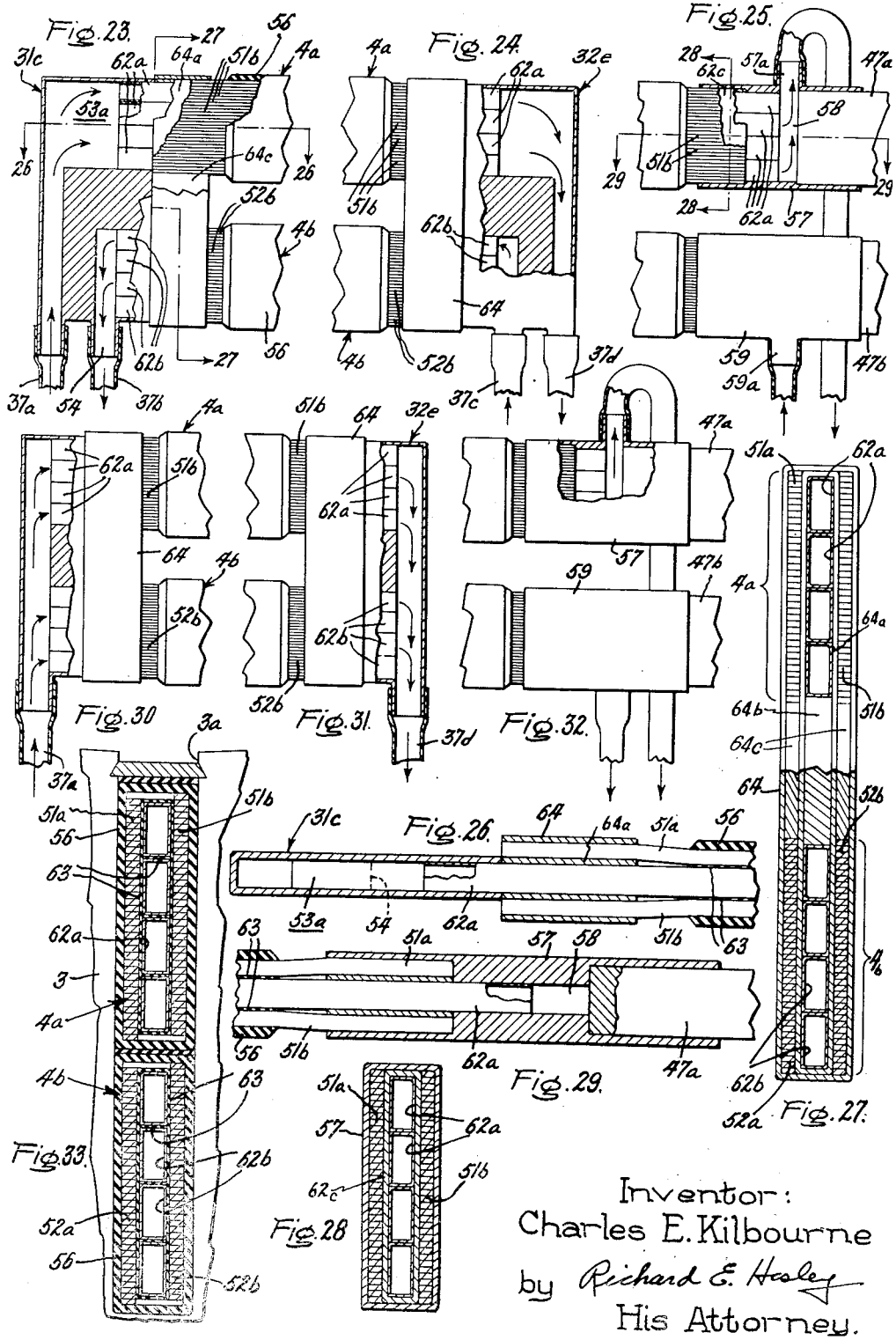

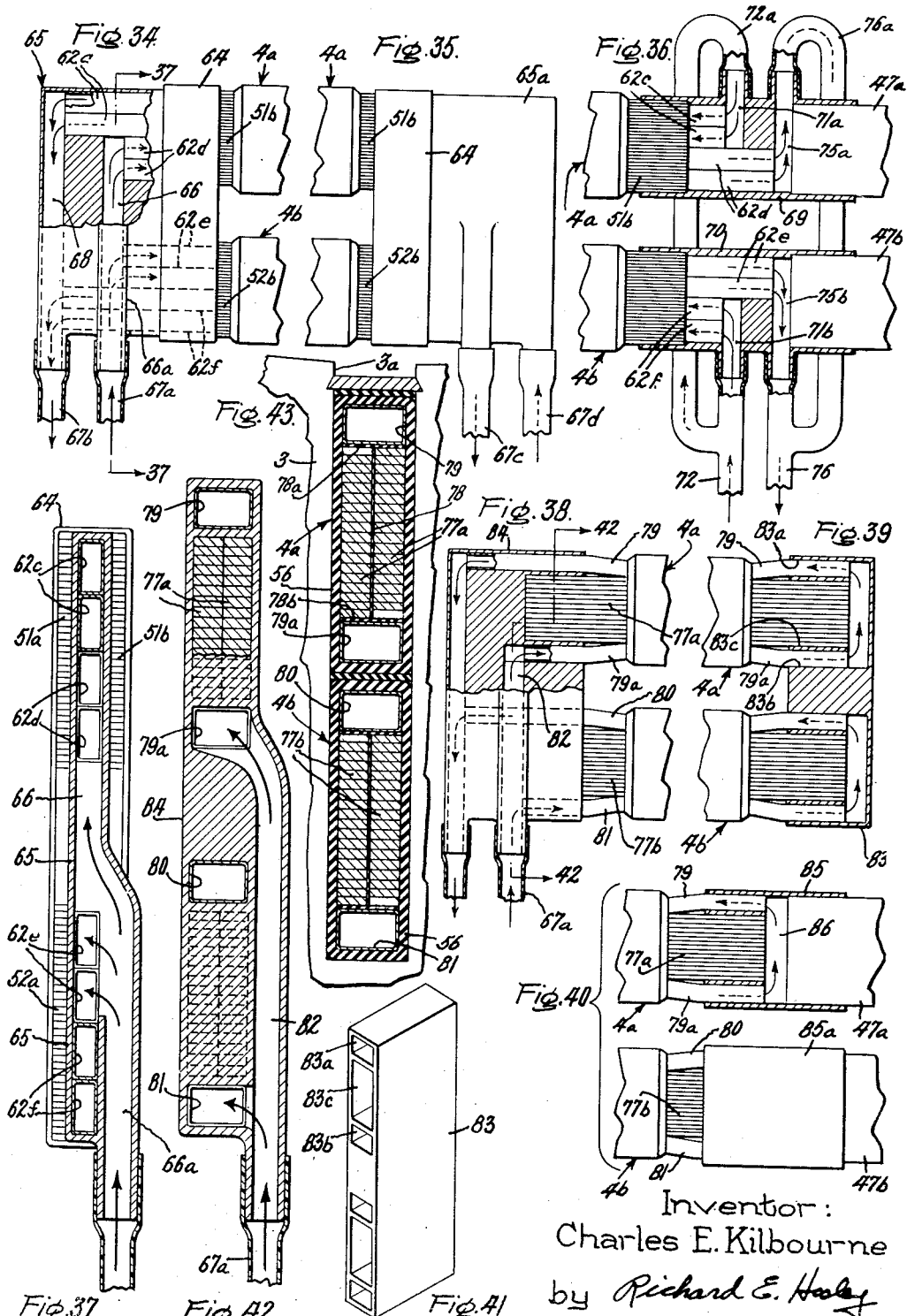

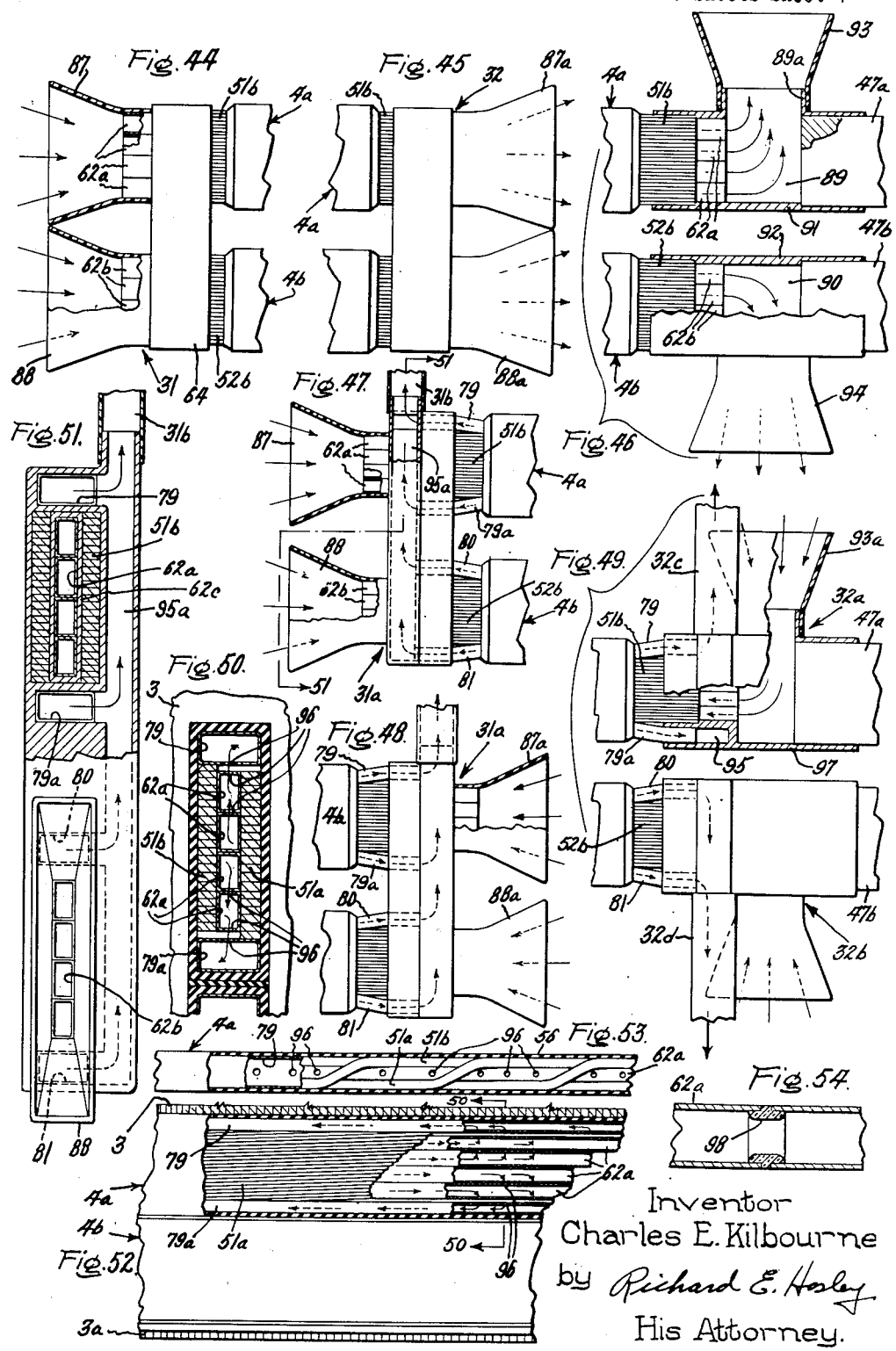

United States Patent Office 2,695,368
Patented Nov. 23, 1954

2,695,368

DYNAMOELECTRIC MACHINE STATOR WINDING WITH FLUID-COOLING PASSAGES IN CONDUCTOR BARS

Charles E. Kilbourne, Schenectady, N. Y., assignor to General Electric Company, a corporation of New York Application January 27, 1953, Serial No. 333,512

20 Claims. (Cl. 310—64)

This invention relates to dynamo-electric machines, particularly to the construction and means of cooling the conductor bars constituting the windings by a coolant fluid flowing within the main ground insulation of the bars. The invention is particularly applicable to fluid-cooled stator windings of very large generators of the type adapted to be direct coupled to steam or gas turbine type prime movers.

Ordinarily, very large capacity turbine-generators have a stationary annular "armature" member with longitudinally extending slots containing an armature winding in which is induced an alternating current output when a suitable exciting current produces a magnetic field in a rotor "core" member, which has longitudinally extending slots containing a field winding. As the core and armature windings increase in axial length, it becomes progressively more difficult to cool the windings by conventional ventilating systems. Thus, a principal limiting factor affecting the output of such large turbine-generators is the temperature rise of the copper conductors making up the windings. It has previously been proposed that the most effective cooling for the windings may be obtained by circulating a suitable coolant fluid in close heat transfer relation with the metal of the current-carrying conductors, that is, with the coolant fluid passage disposed within the main "ground insulation" which electrically separates the copper conductor from the armature laminations. The increased effectiveness of such a cooling system is due to the fact that the heat generated in the conductors need not pass through the electrical insulating material, which is also a fairly good thermal insulator. Consequently, there is less possibility of deterioration of the dielectric characteristics of the insulation due to high temperatures to which it would otherwise be subjected. While it has been long realized that such a "direct-cooling" system promises very substantial benefits in the design of large turbine-generators, the practical difficulties involved in circulating the coolant directly through the current-carrying conductors has prevented the commercial realization of such benefits.

Accordingly, the primary object of the present invention is to provide improved conductor bar arrangements having cooling passages within the main ground insulation, with comparatively simple yet effective means for getting the cooling fluid into and out of the conductor bars.

A further object is to provide direct-cooled conductor bar structure which is particularly suited for cooling by liquids of high heat capacity, but also readily applicable to cooling by various gases.

A still further object is to provide a liquid-cooled armature bar construction of the type described which may be made sufficiently fluid tight as to render feasible the use of high heat capacity liquids.

Other objects and advantages will become apparent from the following description taken in connection with the accompanying drawings, in which Figures 1, 2, 3, 4 are longitudinal views in section of large turbine-generators having direct-cooled stator windings in accordance with the invention; Figure 5 is a diagrammatic representation of a complete fluid cooling circuit; Figure 6 is a partial perspective view of the end portions of the stator armature and the windings projecting therefrom; Figure 7 is a sectional view of one type of direct liquid-cooled conductor bar of the type shown in Figure 6; Figure 8 is a detail perspective view of one conductor strand of the bar of Figure 7; Figure 9 is a sectional view of one pair of conductor bars and the end fitting connecting them, Figure 7 being a section taken on the irregular plane 7—7 of Figure 9; Figure 10 is a sectional view of the fluid and electrical connections for the opposite ends of the bars of Figure 9, and Figure 11 is a similar detail view showing the modification required for those bars from which connections are made to the external electric circuit; Figure 12 is a perspective view of the bar end fitting of Figure 10; Figures 13, 14, 15 are sectional views generally similar to Figures 9–11 but arranged for somewhat different fluid connections; Figures 16, 17 are diagrammatic representations of variations in the fluid flow path possible with the conductor bar structures of Figures 13–15; Figures 18, 19, 20 are still further modifications of the conductor bar structure, and Figures 21, 22 are diagrammatic representations of variations in the fluid circuit for the bar structures of Figures 18–20; Figures 23, 24, 25 are detail views partly in section of a somewhat different direct-cooled bar structure in which the coolant passages are formed by separate tube members disposed in intimate thermal conductive relation with the electrical conductors; Figure 26 is a sectional view taken on the plane 26—26 in Figure 23; Figure 27 is a sectional view taken on the plane 27—27 in Figure 23; Figure 28 is a sectional view taken on the plane 28—28 in Figure 25; Figure 29 is a sectional view taken on the plane 29—29 in Figure 25; Figures 30, 31, 32 are detail views partly in section of a still further modification of the conductor bar structure having separate coolant fluid tubes; Figure 33 is a sectional view of a complete slot of the armature showing two similar bars of the construction of Figures 23, 24, 25; Figures 34, 35, 36 are detail views partly in section of still further modifications of the bar structure having solid conductor strands and separate cooling tubes; Figure 37 is a sectional view taken on the plane 37—37 in Figure 34; Figures 38, 39, 40 are detail sectional views of conductor bar structure having coolant tubes arranged as shown in the transverse sectional view of 42, which is taken on the irregular plane 42—42 in Figure 38; Figure 41 is a perspective view in elevation of the bar end fitting of Figure 39; 43 is a sectional view showing an entire armature slot containing a pair of simular conductor bars of the type shown in Figures 38–40; Figures 44, 45, 46 are details partly in section illustrating conductor bar structure having separate cooling tubes especially adapted for a gaseous coolant; Figures 47, 48, 49 show bar end structure generally similar to that of Figures 44–46 but having differently arranged fluid passages; Figure 50 is a transverse section of the conductor bar structure of Figures 47–49; Figure 51 is a section taken on the irregular plane 51—51 in Figure 47; Figures 52, 53 are detail views illustrating the fluid flow path at the center of bars in accordance with Figures 47–51; and Figure 54 is a detail sectional view illustrating an insulated joint construction provided at an intermediate point in the length of each of the coolant fluid tubes.

Generally stated, the invention is practised by providing coolant passages within the main ground insulation of each conductor bar, so that heat generated within the conductor need not pass through the electrical insulating material which has poor thermal conductivity. Special fittings at one or both ends connect the bar electrically to a circumferentially spaced bar and at the same time provide means for getting the coolant fluid into and out of the bar cooling passages.

Referring now more particularly to the drawings, Figure 1 illustrates in diagrammatic fashion a large generator adapted to be driven by a steam turbine and having a shaft 1 carrying a rotating field or "core" member 2, which may be of any suitable construction. The details of the core are unimportant here but it may be noted that there are ventilating passages (not shown) for circulating cooling gas through the core.

The laminated stator member 3 is provided with axially extending slots in which are disposed the circumferentially spaced conductor bars 4. Ordinarily, there would be two such bars, identified 4a, 4b in radial alignment in each of the slots.

As has become common in very large capacity turbine-generators, the casing 5 is fluid tight, provided with special sealing means (not shown) where the shaft projects through the ends thereof, and is filled with a gas, such as hydrogen, at a suitable pressure which may be on the order of 2 atmospheres. Contained within, or disposed closely adjacent, the housing 5 are suitable heat exchangers 6a, 6b for removing heat from the cooling gas. Suitable pumping means are provided for causing appropriate circulation of the coolant. In Figure 1 this includes a comparatively low pressure fan 7 at the right-hand end of the shaft 1 and a larger diameter higher pressure fan 8 at the left-hand end of the shaft.

As will be apparent from the schematic showing in Figure 1, suitable baffle and conduit means are disposed within the casing to direct the flow of gas as indicated by the arrows. The high pressure fan 8 pumps the coolant gas through the water-cooled heat exchanger 6a to a plenum chamber 9, whence a portion flows into the ends of the rotor cooling passages as indicated by arrow 10. Another portion of coolant from chamber 9 flows axially through a conduit 11 to a second plenum chamber 12, whence it enters the rotor cooling passages from the right-hand end, as indicated by arrow 13. This coolant admitted to the rotor ends flows radially outward through suitable passages in the laminated armature 3, as indicated by the arrows 14, 15, being received in annular chambers 16, 17. From these chambers it passes by way of axial conduits 18, 19 into a large central collecting chamber 20.

The low pressure fan 7 receives its cooling fluid from the water-cooled heat exchanger 6b and discharges it through axial conduits 21, 22 to spaced annular chambers 23, 24 disposed at either side of the hot gas collecting chamber 20. From these chambers 23, 24, coolant flows radially inwardly through the stator member as indicated by arrows 25, 26. This coolant flows through the gap between rotor and stator, and through cooling passages in the rotor as indicated by arrows 27, 28. It then flows radially outward through the armature as indicated by arrows 29, 30, being received in the hot gas collecting chamber. From chamber 20, the coolant passes again through heat exchanger 6b.

As will be apparent from Figure 1, the arrangement provides lower pressure coolant from fan 7 for cooling the intermediate portions of the stator and rotor, and comparatively higher pressure coolant, from the fan 8, for the rotor cooling passages. This higher pressure coolant is also supplied to the cooling passages defined within the conductor bars 4. This coolant for the stator conductors is admitted through bar end fittings shown diagrammatically at 31 and leaves through somewhat similar fittings 32 at the right-hand end of the machine. These fittings have portions arranged to serve as electrical connectors so that the conductor bars define the proper electrical circuit through the stator, and also serve the dual function of getting the coolant into and out of the bars. Cooling fluid discharged from the fittings 32 is collected in the annular chamber 33 whence it passes by way of conduit 34 to the chamber 17 and back to the primary heat exchanger 6b.

Figure 2 discloses a somewhat similar cooling system in which the stator conductors 4 are again cooled by gas entering the left-hand end fittings 31 and leaving through the right-hand end fittings 32. The arrangement differs in that there is a low pressure cooling fan 7a at the right-hand end of shaft 1 and a similar low pressure fan 7b at the left-hand end. The fan 7b supplies coolant to an annular chamber 22b whence it flows through conduit 22c to supply chamber 24.

Similar components in Figures 1 and 2 are indicated by like reference numbers, and the gas flow in Figure 2 will be obvious from the flow arrows and the similarity to the above-described circuit in Figure 1.

Figure 3 illustrates a still further modified form of gas-cooled machine having a primary heat exchanger 6c at the middle of the casing and secondary exchangers 6d and 6e at the respective ends of the casing. Likewise, there is a low pressure fan 7a at the right-hand end of the shaft 1 and a second fan 7b at the left-hand end. Adjacent each low pressure fan is a high pressure fan 8a, 8b respectively. The general similarity of the cooling gas flow path shown in Figure 3 to that shown in Figure 2 will be apparent from the flow arrows in Figure 3. The principal difference lies in the provision of the two low pressure fans 7a, 7b for furnishing coolant to the air gap and rotor end portions and to the intermediate portions of the stator and rotor, while the separate high pressure fans 8a, 8b furnish the coolant for the direct-cooled conductor bars 4.

It will be apparent from Figures 2 and 3 that a further similarity lies in the fact that at either end of the stator armature there is an annular box member, the one at the right-hand end being identified 33a forming the chamber 33, and the one at the left-hand end being identified 35a defining the chamber 35. In Figure 2, the chamber 35 is the coolant supply chamber for the conductor bar end fittings 31 and the other chamber 33 is the coolant collector chamber into which the conductor bar end fittings 32 discharge spent conductor cooling fluid. On the other hand, in Figure 3 both chambers 33 and 35 are coolant inlet chambers for the respective bar end fittings 31a, and 32a, 32b. Used coolant is discharged from the respective end fittings by conduits 31b, 32c, 32d respectively. The construction and arrangement of these end fittings will become apparent from the description of Figures 47—49 hereinafter.

The cooling systems of Figures 1, 2 and 3 are specially adapted for use with a gaseous coolant such as air or hydrogen. Where the same gaseous coolant is used both in the rotor and the stator, it is immaterial that there is a substantial amount of coolant leakage at the point where the conductor bars enter the armature slots. Thus, for instance, it makes no difference in the construction of Figure 2 that high pressure coolant in the supply chamber 35 may leak into the gap between stator and rotor.

Accordingly, Figure 4 illustrates a still further direct-cooling scheme which is particularly applicable to use with liquid coolants for the direct-cooled conductor bars, although it may also be used with gaseous coolants. In Figure 4, the rotor 2 may employ any suitable gas ventilated cooling system such as those illustrated in Figures 1–3. The coolant for the conductor bars 4a, 4b is circulated from two or more annular headers 36a, 36b, 36c, 36d. Only two of these headers are required, therefore those identified 36c, 36d are shown in dotted lines. As indicated by the flow arrows in Figure 4, the coolant may be supplied from header 36a and removed through header 36b. Or it may be supplied through 36a and removed through 36d, there being counter-flow coolant entering header 36c and discharged from 36b. Of course, coolant may also enter both conduits 36a and 36b, and leave through conduits 36c and 36d. The headers are connected to the respective bar end fittings 31c, 32e by a plurality of separate circumferentially spaced tubes 37a, 37b, 37c, 37d. The internal construction of the bar end fittings 31c, 32e will be apparent from the detail views described more particularly hereinafter.

It will be apparent that the construction of Figure 4 provides a fluid tight cooling system for the conductor bars 4a, 4b, so that the fluid in the bars cannot contaminate the gaseous coolant used for the rotor and laminated armature. Thus, it becomes feasible to use almost any fluid coolant meeting the many requirements necessary for such a system. Any liquid coolant used must, of course, be a non-conductor of electricity, must have good thermal capacity, and must be chemically stable in order that corrosive decomposition products will not be formed. It is also preferably physically stable, having a low vapor pressure, so there is no tendency to evaporate and form bubbles in the cooling system. It is preferably non-combustible, to avoid fire hazard in case of a breakdown of insulation within the machine and the resulting formation of an arc. It should also be non-toxic for the safety of operating personnel.

Since it is extremely difficult to find a liquid coolant having all these desirable properties, it will ordinarily be necessary to compromise on some factors and perhaps experiment to find the one most suitable for a given machine. Liquids which may be considered are the chlorinated diphenyl liquids such as that known commercially as "askarel," or the petroleum product known as "transil oil," or various organo-polysiloxane liquids, or flour-carbons. In some cases, distilled water with a suitable corrosion inhibitor added may be used.

The complete liquid circuit for a cooling system arranged as in Figure 4 is illustrated diagrammatically in Figure 5. Coolant liquid is taken from the reservoir 38 and delivered through a parallel set of pumps 39, filters 40, and heat exchangers 41. This parallel arrangement is of course employed as a safety feature, and to permit one pump-filter-cooler unit to be taken out of service for replacement or repair without shutting down the entire machine. The coolant is supplied by conduit 42 to a semi-annular header 43 whence it passes through branch pipes 43a, 43b, 43c, 43d to a sectional annular header 36a. It will be appreciated that this conduit corresponds to the header 36a in Figure 4. Coolant is supplied to the respective conductor bars by way of separate branch fluid conduits identified 37a in Figures 4 and 5.

It is to be noted that Figure 5 is a "developed" diagrammatic illustration, in two respects. The right-hand half of the figure represents an end view of the annular supply headers, while the left-hand half is a developed view of the armature winding pattern. No attempt is made in Figure 5 to illustrate completely the electrical connections for the winding, the lines representing instead the fluid flow paths. Solid lines represent the cooled fluid coming in, and dotted lines represent the spent coolant leaving. The boxes 31c represent diagrammatically the special bar end fittings which serve to make both electrical and fluid connections between the respective pairs of connected bars. Likewise, the boxes 32e at the other end of the conductor bars are the fittings identified by the same reference number in Figure 4.

It will be observed in Figure 5 that a special type of bar end fitting is required at 32f where the electrical leads 47 are connected from the armature winding to the external circuit. The mechanical construction of this type of fitting will become apparent from the description below.

Spent cooling fluid leaves the bar end fittings 31c through the separate branch conduits 37b, which communicate with a segmental annular header 36b. Suitable branch conduits 44 communicate with the discharge header 45 which returns the cooling liquid to the reservoir 38 through conduit 46.

It is to be particularly noted with respect to Figure 5 that conduits 37a, 37b are either of electrical insulating material or have an insulator incorporated in them, as shown at 37e, 37f in Fig. 4. Therefore, it makes no difference to the electrical circuit whether a given liquid conduit 37a is connected to a particular fitting 31c, or to a fitting on either side thereof. That is, the fluid circuit is entirely independent of the electrical circuit. Thus, great flexibility is possible in the design of the cooling circuit, simply by appropriate connections of the branch conduits 37a, 37b between the headers 36a, 36b and the respective bar end fittings 31c. It is also of interest to note that with the arrangement in Figure 5 the fluid connections to the external coolant circuit are all made at the right-hand end of the stator 3, while the electrical leads 47 are all brought out at the left-hand end of the winding. In an actual winding pattern for a generator producing multiphase alternating current, there would of course ordinarily be more than two connections to the external electrical circuit. Again, it is to be emphasized that the winding pattern shown in Figure 5 is not intended in any way to limit the applicability of the invention, since the fluid cooling circuit to which this invention particularly relates is applicable to any electrical circuit.

While the fluid cooling circuit of Figures 4 and 5 has been described as particularly adapted for a liquid coolant, it is also well-suited to use with systems using gaseous fluids where the coolant for the conductor bars is at a substantially different pressure from that which cools the rotor and stator laminations, or where it is desired for other reasons to prevent all leakage from the conductor bar cooling circuit. With a gaseous coolant, it is of course necessary to design the headers and communicating pipes and the passages in the conductors substantially larger, because of the lower thermal capacity of the gas. This disadvantage may be partially compensated by employing substantially higher gas pressures in the bar cooling circuit.

Referring now more particularly to the mechanical construction of the stator winding and the fluid connections therefor, Figure 6 is a perspective view of a small segment of the laminated stator 3 showing the axially extending slots 3a with the conductor bars 4a, 4b disposed therein. It will be observed that the reference numeral 4a represents the radially inner conductor bar in each slot while 4b represents the radially outer bar. Each bar projects axially from the end of the slot, then curves circumferentially through a limited arc, and has an extreme end portion extending axially into the fluid-electrical connector fittings 32e. The bar end fittings are disposed substantially radial relative to the axis of the armature, with the inner end portion receiving the end of a bar 4a and the outer end of the fitting connected to the end of a bar 4b in the outer layer of bars.

The mechanical construction of the individual conductor bars and their cooperative relation to the bar end fittings will be seen by reference to Figures 7–12. Figure 9 is a detail sectional view of the bar end fitting 31c, which has the connections to the external fluid circuit. The fitting 31c itself is fabricated of copper or other suitable electrical conducting material and defines a pair of spaced sockets 49, 50 adapted to snugly receive the exposed ends of the conductor strands 51, 52. Figure 10 illustrates a cross-section of the corresponding opposite end fitting 32e, a perspective view of which is shown in Figure 12. This fitting could of course be fabricated as two separate members, to be fitted separately to the respective bar end portions and then connected by a suitable conductive bridge member and tubes connecting the fluid passages in desired relation.

The simplest type of direct-cooled conductor bar structure is perhaps one in which each strand 51 is a hollow tube of rectangular cross-section, as shown in perspective in Figure 8. Each strand is insulated from adjacent strands, as for instance by a spiral winding 51c of a suitable insulating tape (perhaps of asbestos paper or glass fiber), or this insulation may be provided by a "felted" coating of asbestos or glass fibers bonded to the tube by a suitable plastic cement. The disposition of the multiple strands in the conductor bar will be seen in Figure 7, which is a section taken on the irregular plane 7—7 in Figure 9. It will be obvious that the radially inner bar 4a comprises a double row of the hollow tubular strands 51. Bar 4b also has a double row of strands 52. In Figure 7 the insulation between strands is not shown because it is an extremely thin layer, being required to withstand a voltage differential of only a few volts. The purpose of thus insulating the separate strands from each other is merely to prevent induction of circulating currents between strands, which eddy currents would show up as additional heat losses in the bars.

The fluid connections will be apparent from Figures 9, 10. Coolant from conduit 37a is admitted by a passage 53 in fitting 31c to a supply chamber 53a which of course communicates with the cooling passages in the respective strands 51. Likewise, conduit 37b communicates with a passage 54 which receives the spent coolant discharged from strands 52. It will be apparent in Figure 10 that the fitting 32e differs in that it has a single communicating chamber 55 for admitting coolant received from the strands 51 to the cooling passages in the strands 52.

Figure 12 shows a perspective view of the right-hand end fitting 32e with recesses 49a, 50a for receiving the respective conductor strands.

It will also be observed in Figures 9 and 10 that the bars 4a, 4b are covered by heavy main or ground insulation 56 which has to stand the full voltage differential to ground, which may be on the order of thousands of volts. It is the resistance of this covering to the flow of heat generated within the conductors which has made advisable the direct cooling of the conductors by coolant flowing in more direct contact with the current-carrying metal.

While the detailed method of assembling the conductor bars in the slots is not important in describing the present invention, it may be noted that the strand insulation 51a, is removed from the extreme end portions of the strands 51, and the bare ends soldered or brazed together in good electrical conducting relation. These soldered bar end portions are fitted into recesses 49, 50 and then soldered to the fitting 31c. The outer surface of the fitting is then completely covered by ground insulation as shown at 56a in Figures 9 and 10. Thus, it will be apparent that the conductor bars are connected by the end fittings in excellent electrical conducting relation, the fittings also providing convenient passages for communicating cooling fluid from one bar to the next or to the external fluid circuit.

The structural details of the fittings 32f in Figure 5 are illustrated in Figures 6 and 11. In Figure 6 it will be seen that the conductors 47a, 47b, 47c, 47d project from the bar end fittings 32f for connection to the external electrical circuit.

Actually, the end fitting 32f, in Figure 11 comprises two separate and similar fittings, each consisting of a copper sleeve member 57 into which the strand end portions are soldered or brazed, and which defines between the ends of the strands 51b and the adjacent end of conductor 47a a cooling fluid chamber 58. The fitting 57 also defines a short laterally projecting tubular member 57a which forms the fluid outlet for chamber 58. The other fitting 59 defines a similar fluid inlet chamber 60 and has a projecting tubular inlet portion 59a. These fittings are covered with insulation, as shown at 59b. It is to be particularly noted that the tubular portions 57a, 59a, project in opposite directions from each other and are connected by a hose or tube of insulating material 61, such as laminated glass fabric impregnated with a suitable plastic, insulating rubber, or any other suitable insulating materials. This arrangement provides a long dielectric path through the liquid between the metal outlet portion 57a and the metal inlet portion 59a. This is necessary in order to prevent leakage of stray currents along the surface of the insulating tube or through the liquid.

It goes without saying that the fluid conducting tubes 37a, 37b, 61, etc. must be cemented or otherwise tightly bonded to the cooperating portions of the conductive fittings 31c, 57, 59, etc. so there can be no leakage of the coolant through the joint between the metal parts and the insulating material of the conduit. The problem of making this connection is simplified in the case of the conduits 37a, 37b if they are made as metallic flexible hose members, with metal end fittings which can be soldered or brazed, and provided with separate insulators 37e, 37f, as shown in Figure 4.

Figures 13, 14, 15 represent bar end fitting constructions analogous to those of Figures 9, 10, 11 except that the fluid passages are arranged so that coolant enters through conduit 37a connected to fitting 31c and leaves through conduit 37d connected to fitting 32e. Likewise, coolant enters conduit 37c and leaves through conduit 37b. Thus, both bars 4a, 4b are cooled by fresh fluid in counterflow relation. Figure 15 represents the fluid connections for the fittings connected electrically to the external circuit bars 47a, 47b, coolant connections to the external fluid circuit being by way of conduits 61a, 61b.

Attention is directed to the fact that, for the sake of simplicity, the insulation covering the bar end fittings, identified 56a and 59b in Figures 9–11 is omitted, beginning with Figure 13. It will be appreciated by those skilled in the art that in all modifications shown the conductive fittings will be so insulated.

Figures 16 and 17 illustrate two types of fluid flow path which may be obtained by appropriately connecting the coolant supply and discharge tubes 37a, 37b, 37c, 37d etc. to the proper headers 36a, 36b. For flow as in Figure 16, all of the radially outer bars 4b are connected by the supply tubes 37a (not shown in Figure 16) to the supply header 36a (Fig. 5). All of the radially inner bars 4a are connected by discharge tubes 37b to the header 36b (Figure 5). Thus it will be seen that the direction of fluid flow is the same in all top bars, and in counterflow relation with the flow in the bottom bars. To obtain the fluid flow represented by the arrows in Figure 17, alternate bars 4b are connected to the respective supply and discharge headers 36a, 36b. Likewise in the inner row, alternate bars 4a are connected to the respective discharge and supply headers. It will be apparent that this arrangement provides counterflow both as between adjacent conductor bars in a given slot and as between corresponding bars in adjacent slots.

It is believed obvious to those skilled in the art how the structures of Figures 13, 14, 15 would be connected in the fluid circuit of Figure 5 to produce the flow patterns illustrated in Figures 16 and 17.

Figures 18, 19 and 20 illustrate still further constructions adaptable to the fluid flow patterns illustrated diagrammatically in Figures 21, 22. In Figures 18 and 19 the bar end fitting 31c is connected to a single fluid inlet conduit 37a and has a common supply passage 53a communicating with the hollow conductors 51 and 52. The discharge fitting 32e shown in Figure 19 is similarly arranged with a single common discharge chamber 55 communicating with conduit 37d. Figure 20 illustrates the corresponding construction showing the coolant connections to the bar end fittings connected to the external electrical circuit members 47a, 47b.

Figure 21 illustrates coolant flow in the same direction in all conductor bars. Figure 22 illustrates the construction of Figures 18–20 connected to the supply and discharge headers so there is counterflow relation, as between adjacent slots, while the fluid flow is the same direction in both bars in a given slot.

The modifications illustrated in Figures 16, 17, 21, 22 demonstrate the extreme flexibility of the system with respect to the fluid circuits possible, with very simple alterations in the piping connections. It will also be apparent that any of these various fluid circuits are readily obtained irrespective of the electrical circuit employed.

Figures 23 through 54 show alternate mechanical constructions for direct-cooled conductor bars in which the current-carrying strands are of solid cross-section and the coolant is conveyed by special tubes insulated electrically from the conductors by comparatively thin insulation offering little resistance to the flow of heat from the conductors to the cooling tubes.

Figures 23 through 37 illustrate bar constructions having two spaced radial stacks of solid conductors with an intermediate row of cooling tubes. As will be apparent from a comparison of Figures 28, 27 and 33, the conductors 51a, 51b are separated by the row of cooling tubes 62a. The conductor strands are covered by insulation 51c as shown in Figure 8 but are solid rather than tubular. The rectangular cooling tubes 62a are of non-magnetic material, such as a suitable brass or stainless steel and are insulated from each other and from the conductors by comparatively thin electrical insulation 63, which is roughly coextensive with the main insulation 56. The bottom bar 4b is of the same construction. It may be noted that the cooling tubes have comparatively thin walls, perhaps on the order of .02 to .04 inch thick and are of a material having good heat conductivity.

To insure good electrical contact between the conductor strands, the bare end portions thereof are soldered together as described above in connection with Figure 9, and the complete bundle of conductors and cooling tubes is clamped together by a soldered or brazed conductive strap member 64, as will be apparent from a consideration of Figures 23 and 27.

The tubes 62a, 62b are also bound together by an inner conductive clamp band 64a (Figs. 26 and 27), with a conductive spacer block 64b between the two sets of tubes. Similar spacers 64c are inserted between the respective sets of conductor strands 51b, 52b. These spacers and bands are all soldered together so the two sets of strands are electrically bonded together, and to the conductive fitting 31c by reason of the bond between the tube end portions and the fitting.

It will be apparent from Figure 23 how fluid is supplied by way of conduit 37a to the chamber 53a, whence coolant flows through the tubes 62a, hot fluid being discharged from the corresponding tubes 62b to the chamber 54 and discharge conduit 37b.

Figure 24 shows construction similar to Figure 23, as applied to a fluid circuit as in Figures 13 and 14.

Figure 25 shows bar construction corresponding to Figures 23 and 24 as adapted to the conductors 47a, 47b of the external electrical circuit. Here there is no clamping band 64 as in Figures 23 and 24, and it will be obvious how the strand ends 51b are soldered to the fitting 57, the fluid connections being as shown in Figure 15. As seen in Figs. 25 and 28, the tubes 62a are bound by a soldered clamp band 62c.

Figure 26 is a sectional view taken on the plane 26—26 in Figure 23 showing more clearly how the conductors 51a, 51b emerge from the ground insulation 56 and are soldered between the clamping bands 64, 64a while the intermediate cooling tubes 62a project slightly beyond the conductors 51a, 51b and are soldered into the fitting 31c.

Figure 29 is a sectional view looking down on the top of the bar end structure of Figure 25, taken on the plane 29—29, showing the relation between the conductors 51a, 51b, 47a to the cooling tubes 62a and to the end fitting 57.

Figures 30, 31, 32 illustrate bar construction with hollow cooling tubes similar to that of Figures 23–25 but arranged for a cooling fluid circuit like that of Figures 18, 19, 20 respectively.

Figure 33 is a transverse section taken through one slot of the laminated armature 3 showing the disposition of the radially inner bar assembly 4a and the outer bar 4b, the cooling arrangement being in accordance with Figures 23–32.

Figures 34, 35 and 36 illustrate a still further modification of conductor bar structure of the general type disclosed in Figures 23–33. Here, however, the cooling tubes in each bar are divided in two groups, as will be seen from a comparison on Figures 34 and 37. The lower groups of tubes in the upper bar 4a, identified 62d, and the upper group of tubes 62e in the lower bar 4b, are connected by a common passage 66 in end fitting 65 to a coolant inlet conduit 67a. Likewise, the upper group of tubes 62c in bar 4a, and the lower group of tubes 62f in bar 4b communicate with a common passageway 68 from which spent coolant is discharged by way of conduit 67b. The opposite end fitting, identified 65a in Figure 35, has similar internal passages communicating with fluid conduits 67c, 67d. It will be apparent from the flow arrows in Figures 34, 35 that coolant enters conduit 67d, passes to the left through the groups of tubes 62c, 62f and leaves through conduit 67b, coolant also flowing in counterflow relation in at conduit 67a to the right through tubes 62d, 62e, and out through conduit 67c.

The sectional view in Figure 37, taken on the plane 37—37 in Figure 34 will illustrate more clearly how the supply conduit 67a communicates by way of an offset passage 66a with the inlet passage 66 defined by the fitting 65.

Figure 36 shows how the counterflow arrangement of Figures 34, 35 is applied to the bar end fittings where the electrical connections 47a, 47b emerge from the winding. The special conductor end fittings 69, 70 are provided with separate supply chambers identified 71a, 71b, to which coolant is supplied by inlet conduit 72 having the branch conduit 72a. As described above in connection with Figure 11, the branch conduit 72a is connected to supply conduit 72 at the opposite side of bar 4b from the bar 4a, so as to provide a long dielectric path through the cooling fluid between the respective conductor bars. The two groups of coolant tubes 62c, 62f, communicate with the supply chambers 71a, 71b, respectively. Similarly, the two groups of tubes 62d, 62e discharge into chambers 75a, 75b, which in turn communicate with a branch conduit 76a connected to the discharge conduit 76. It will be observed that the construction of Figures 34–37 is very similar to that of Figures 23–33, with similar clamp bands and spacer blocks, except that in each bar the coolant tubes are divided into two groups in which the flow is in opposite directions. Thus, the construction employing the separate cooling tubes is adaptable to the same flexibility in the arrangement of the cooling fluid circuit as described above in connection with Figures 16 and 17.

Figures 38, 39, 40 and the details thereof shown in Figures 41, 42, 43, illustrate still another structure in which the coolant is conducted through tubes separate from the solid conductor strands. Here a single wide coolant tube is disposed at either end of the stack of solid conductor strands in each bar. This disposition of the cooling tubes relative to the strands is seen best in Figure 43, which represents a complete stator slot showing both bars 4a, 4b in section. The solid conductor strands 77a are disposed in two radial stacks, separated by a thin layer of insulation 78. The innermost cooling tube 79 extends across the width of both rows of conductors and is insulated therefrom by an insulating layer 78a. At the other end of the stack of strands 77a, there is a second cooling tube 79a insulated from the strands by a layer of insulation 78b. It will be apparent from Figure 43 that the bar 4b is of the same construction, having the strands 77b with cooling tubes 80, 81 disposed at opposite ends of the stack of strands.

Figures 38–42 illustrate the fluid connections to a bar of the construction shown in Figure 43. Coolant is admitted through conduit 67a to an inlet passage 82 which communicates with the lowermost cooling tube in each bar, identified 81, 79a. The opposite end of the bar structure is illustrated in Figure 39, as having an end fitting 83, a perspective view of which is shown in Figure 41. It will be apparent that each half of the fitting 83 defines spaced sockets 83a, 83b for receiving the cooling tubes 79, 79a respectively and an intermediate socket 83c into which the conductor strand end portions are soldered. It will be seen from Figures 39, 41 that the lower bar 4b is similarly arranged.

A still further modification could be made by using a fitting similar to fitting 84 at the right-hand end of the bars, instead of the fitting 83, so that a fluid circuit analogous to that shown in Figures 34, 35 could be employed.

Figure 40 illustrates the special fittings 85, 85a used to connect the conductors 77a, 77b to the external leads 47a, 47b. These fittings define an internal chamber 86 which communicates between the coolant tubes 79, 79a.

Figures 44, 45, 46 illustrate the application of cooling tube arrangements like those in Figures 23–25 to a system using a gaseous coolant. Thus, Figures 44–46 may be considered to represent the detailed construction of the gas-ventilated bar arrangement shown in Figure 2. The similarity of the construction of Figures 44–46 to that of Figures 23–25 will be noted from the like reference numerals. Here the coolant inlet passages are defined by a flaring "chute" of insulating material, identified 87, 88. Figure 45 represents the bar end fittings 32 as shown in Figure 2, and the flow of coolant through the bars will be obvious from a comparison of Figures 2, 44, and 45.

Figure 46 illustrates the construction of Figures 44, 45 as applied to the external circuit conductors 47a, 47b. It will be seen that the coolant tubes 62a, 62b discharge into chambers 89, 90 defined between the ends of the respective conductor bars 4a, 4b and conductors 47a, 47b. The respective conductive fittings 91, 92 are similar to those of Figure 25 except that the fluid discharge port 89a is much larger because of the greater volume flow of gaseous coolant required. Port 89a communicates with a "dielectric chute" 93 made of suitable insulating material. It will be apparent that the chutes 93, 94 serve as diffusing discharge nozzles.

Figures 47–53 illustrate the application of a gaseous coolant system to a still different bar construction, which is a composite of the type shown in Figure 33 with that of Figure 43. It will be seen in Figure 50 that the construction includes the two separate stacks of solid conductor strands 51a, 51b, the central row of cooling tubes 62a and the wide transversely extending end cooling tubes 79, 79a. The gas path as shown in Figures 47, 48, 49 is likewise a composite of that described in connection with Figures 23, 25 with that of Figures 38–40. Coolant is admitted through the dielectric chutes, 87, 88 (Fig. 47) which are similar to those similarly identified in Figure 44, and passes through the cooling tubes 62a, 62b. As indicated in Figure 48, coolant also enters the chutes 87a, 88a at the right-hand end of the bars. Spent cooling fluid is discharged by the end cooling tubes 79, 79a and the analogous tubes 80, 81 as shown in Figures 47 and 48. These four coolant discharge tubes communicate with a common passage 95a formed in the conductive end fitting 31a as may be seen better by reference to Figure 51.

Communication between the coolant inlet tubes 62a, 62b and the discharge tubes 79, 79a, 80, 81 is provided by a plurality of axially spaced ports identified 96 in Figures 50, 52, and 53. These ports are spaced axially along the middle portion (perhaps over the center third) of the tubes 79, 62a, 79a, etc. and are aligned so that coolant from the tubes 62a flows radially into the return tubes 79, 79a as indicated by the flow arrows in Figures 50, 52.

It will be apparent to those skilled in the art relating to generate armature windings that the conductor strands 51a in Figure 52 are inclined to the axis of the bar assembly and are "transposed" to the opposite side of the bar as will be seen in the top view of Figure 53. This transposition is typical of the so-called "Roebel bar" type of conductor. It is to be noted that the conductor strands of all the bar constructions disclosed herein will be arranged with this "Roebel transposition," or the equivalent, to prevent circulating currents in the individual bar.

It will be obvious from the above that cooling fluid enters the conductor bars from both ends by way of the chutes 87, 88, and 87a, 88a, transfers from the tubes 62a to the end tubes 79, 79a over the middle third of the length of the bar, and leaves by way of the passage 95a in the end fitting 31a through the conduit 31b.

It now will be seen that the bar end construction of

Figures 47–52 represents the details of the construction shown diagrammatically in Figure 3.

Figure 49 illustrates the modification of the end fittings required where the conductors 47a, 47b emerge for connection to the external electrical circuit. The special end fitting identified 32a in Figure 3 and Figure 49 comprises a conductive fitting 97 which is soldered or brazed to the conductor 47a and to the conductor strands 51b in a manner which will be apparent in Figure 49. The end cooling tubes 79, 79a are likewise soldered into appropriate sockets in the fitting 97. As will be obvious from a comparison of Figure 3 and Figure 51, the discharge chamber 95 communicates with the coolant discharge tube 32c. Cooling fluid is admitted to the end fitting 32a (Figure 49) by a dielectric chute 93a similar to the discharge chute 93 in Figure 46.

It remains to note that the cooling tubes identified 62a in Figure 23, tubes 62c, 62d, etc. in Figure 37, tubes 78, 79, and the analogous coolant tubes in other figures, are each provided somewhere in their length with an electrical insulating device so that no cooling tube defines a continuous electrical conductor extending from one end of the stator to the other. This interruption to the electrical circuit in the cooling tubes may be provided by a suitable coupling sleeve member of ceramic or other plastic insulating material, as shown at 98 in Figure 54. The type of insulating material, the shape of the fitting, and the means for bonding it to the tube sections are not material to an understanding of the present invention. It is necessary only that an interruption to the electrical circuit through the tube be provided at some point between the soldered end portions of the tube, which soldered connections constitute an electrical bond to the respective conductors and end fittings. This insulator is necessary in order to prevent circulating eddy currents in the cooling tubes, which would also add to the heat losses in the conductor bars. This is an important feature, as the coolant tubes are fabricated of metal, such as a stainless steel, in order to get good thermal conductivity, the strength required to resist the forces imposed during the process of molding the insulation on the tubes, and for ease of getting leak-proof connections. Since it is not readily feasible to eliminate circulating currents in the cooling tubes by a "Roebel type transposition" as in the case of the conductor strands, the insulator 98 or equivalent means must be used.

Thus, the invention provides effective, practicable direct-cooled conductor bar structures for dynamo-electric machines which are readily adapted to a great variety of coolant circuits, without regard to the pattern of the electrical circuit in the windings.

While numerous modifications have been illustrated, both with respect to the cooling fluid circuit and with respect to the conductor bar structure for effecting the respective fluid paths, it will be obvious to those skilled in the art that still other modifications are feasible; and it is desired to cover by the appended claims all such modifications as fall within the true spirit and scope of the invention.

What I claim as new and desire to secure by Letters Patent of the United States is:

1. In a dynamo-electric machine having a cylindrical laminated armature member with a plurality of circumferentially spaced axially extending slots, the combination of an insulated conductor bar assembly disposed in each of said slots, each bar comprising a plurality of conductors insulated from each other and surrounded by a main insulating covering, members defining axial fluid cooling passages disposed within said main covering, at least one end of each bar having the end portions of the conductors electrically bonded to a fitting of conductive material and having coolant fluid passages inside, said fitting having a portion electrically bonded to the conductor end portions of another bar disposed in a circumferentially spaced slot, the passages within the bar end fitting including coolant passages communicating with the axial passages in both said bars.

2. In a dynamo-electric machine having a laminated armature member with a plurality of circumferentially spaced axially extending slots, the combination of a pair of radially aligned insulated conductor bar assemblies disposed in each slot, each bar comprising a plurality of conductors insulated from each other and surrounded by a main insulating covering with axial fluid cooling passages defined by members within said main covering, the radially inner bar in each slot having at least one end portion projecting from the end of the armature slot with the conductors thereof electrically bonded to a fitting of conductive material, said fitting having internal fluid cooling passages and being electrically bonded to the conductors end portions of a bar disposed in the radially outer portion of a circumferentially spaced slot, the cooling passages in said fitting including passages communicating with the axial cooling passages of both said electrically connected bars.

3. In a dynamo-electric machine, the combination of an armature member having a plurality of axially extending slots, each containing at least one conductor bar assembly comprising a plurality of members including conductors and surrounded by a main insulating covering, at least some members within said main covering defining longitudinal cooling fluid passages, means providing electrical insulation between the respective conductors, the end portions of each bar projecting from the ends of the armature slots, at least one end of each bar having the extreme end portions of the conductors thereof electrically bonded together and to a fitting member of conductive material, said fitting having internal cooling fluid passages and being electrically bonded to the projecting end portions of the conductors of another bar disposed in a circumferentially spaced slot, the coolant passages in the bar end fitting including passages communicating with the fluid passages in both said bars.

4. A dynamo-electric machine armature bar construction in accordance with claim 3 in which the pair of connector fittings at the respective ends of a given bar each have a single fluid passage communicating with the cooling passages of said given bar and with the passages of another bar in a circumferentially spaced slot, one of said fittings having conduit means communicating with an external fluid supply circuit and the other of said fittings having conduit means communicating with an external fluid drain circuit, whereby coolant flows in the same axial direction through all bars connected to said pair of end fittings.

5. A dynamo-electric machine winding in accordance with claim 3 in which at least some of the bar end fittings are connected to conduits having portions fabricated entirely of electrical insulating material for circulating coolant fluid through the axial passages in the bars.

6. A dynamo-electric machine armature bar construction in accordance with claim 3, in which each bar comprises two radially disposed transversely spaced parallel stacks of conductors of solid cross-section and a radial row of tubular members disposed between said stacks of conductors and adapted to contain coolant fluid, a layer of electrical insulating material separating said conductors and coolant tubes, an outer clamping band member of conductive material surrounding and bonded to the uninsulated end portions of the conductor strands, an inner clamping band member of conductive material disposed around and bonded to the rows of cooling tubes, and spacer block members of conductive material disposed between the tubes and conductors of the respective bars and bonded to said clamping bands.

7. In a dynamo-electric machine having an armature member with a plurality of circumferentially spaced axially extending slots, the combination of a pair of radially aligned insulated conductor bar assemblies disposed in each slot, each bar comprising a plurality of members including conductors and surrounded by a main insulating covering, at least some of said members defining axial fluid cooling passages, the radially inner bar in each slot having at least one end portion projecting from the end of the slot with the conductors thereof bonded in electrically conducting relation to a fitting of conductive material, said fitting being disposed substantially radial relative to the axis of the armature and having internal coolant fluid passages and being bonded in conductive relation to the extreme end portions of the conductors of another bar disposed in the radially outer portion of a circumferentially spaced slot, the coolant passages in said fitting including passages communicating with the axial coolant passages of both said bars.

8. In a dynamo-electric machine having an armature member with a plurality of circumferentially spaced axially extending slots, the combination of a pair of radially aligned insulated conductor bar assemblies disposed in each slot, each bar comprising a plurality of members including conductors surrounded by a main insulating covering, at least some of said members having axial fluid cooling passages, the radially inner bar in each slot having at least one end portion projecting axially and extending circumferentially from the end of the armature slot with an extreme end portion having the conductors thereof bonded in electrical conducting relation to the radially inner portion of a fitting of conductive material, said fitting extending substantially radially outwardly from the end of said inner bar, the radially outer portion of the fitting being bonded in electrically conductive relation to the extreme end portions of the conductors of another bar disposed in the radially outer portion of a circumferentially spaced slot, said fitting defining cooling fluid passages including passages communicating with the coolant passages in both said bars.

9. A dynamo-electric machine armature bar construction including a pair of conductor bars disposed in circumferentially spaced slots of the armature and having a plurality of conductor strands insulated from each other with end portions disposed parallel to each other, the ends of the respective bars being in substantially radial alignment, and a radially disposed connector fitting having recesses for receiving the strand end portions of the respective bars, said fitting being of electrically conductive material and bonded to the strands of both bars, at least some of the strands in each bar being hollow tubes for receiving a coolant fluid, the end fitting having internal passages including passages communicating with said tubes for circulating coolant therethrough.

10. A dynamo-electric machine armature bar construction in accordance with claim 9 in which the bar end fitting has separate coolant passages connected by conduits with portions fabricated entirely of electrical insulating material to an external fluid circuit.

11. A dynamo-electric machine armature bar construction in accordance with claim 9 in which the coolant passages in the end connector fitting comprises a single passage communicating between the cooling passages in both bars.

12. A dynamo-electric machine armature bar construction including a pair of conductor bars disposed in circumferentially spaced slots of the armature and each having a plurality of members including conductor strands, at least some members defining axial cooling passages, the strands of the respective bars being insulated from each other and having end portions disposed parallel to each other and in substantially radial alignment, and a pair of radially spaced fittings of conductive material for connecting the respective bars to an external electrical circuit, each of said fittings having a recess receiving the conductor strand ends of one bar and electrically bonded thereto, the fitting defining a second recess receiving the conductor of the external circuit and electrically bonded thereto, each fitting defining a fluid chamber between the ends of the armature strands and the adjacent end portion of the external circuit conductor, and a fluid conduit of insulating material connecting said fluid chambers in the respective fittings, said conduit emerging from one fitting in a direction radially away from the other fitting then turning 180° and extending past both conductors and then turning another 180° to enter the other fitting at the side thereof opposite said first fitting, whereby a long dielectric path is provided between the two conductors through the insulating tube and the liquid contained therein.

13. In a dynamo-electric machine, the combination of an armature member having a plurality of axially extending slots, each containing a pair of conductor bars, each bar comprising a plurality of members including two radially disposed circumferentially spaced parallel stacks of conductors of solid cross-section and a radial row of tubular members disposed between said stacks of conductors and adapted to contain coolant fluid, a layer of electrical insulating material separating said conductors and coolant tubes, at least one end portion of each bar projecting from the end of the armature slot and having uninsulated extreme end portions of the conductors electrically bonded together and to a bar end fitting member of conductive material, said fitting having internal cooling fluid passages and being electrically bonded to the projecting end portions of the conductors of another bar disposed in a circumferentially spaced slot, the radial row of coolant tubes in each bar being divided into two groups, the bar end fitting defining separate fluid passages each communicating with the passages in only one of said groups of tubes, whereby coolant may be circulated in opposite directions in the groups of cooling tubes in a given bar.

14. A dynamo-electric machine conductor bar assembly comprising a plurality of conductor strands of solid rectangular cross-section arranged in two parallel radial rows with a layer of insulating material between rows of strands, and a cooling tube member at either end of said rows of conductors, each tube being of a width to extend across the ends of both rows of strands, insulating material separating said cooling tubes from the conductor strands, main ground insulation surrounding the strands and tubes, and a bar end fitting of conductive material and having a recess for receiving the extreme end portions of said solid conductors and being electrically bonded thereto, said fitting having also a recess at either side of said first-mentioned recess, the end portions of the cooling tubes being received in said second recesses respectively, the fitting defining passages for circulating cooling fluid through said cooling tubes.

15. In a dynamo-electric machine, the combination of an armature member having a plurality of axially extending slots, each containing a pair of radially aligned conductor bar assemblies, each bar comprising a plurality of conductor strands of solid rectangular cross-section arranged in two parallel substantially radial stacks with insulating material between strands, and a cooling tube member disposed at either end of said stacks of conductors, each tube being of a width to extend across the ends of both stacks, insulating material separating said cooling tubes from the conductor strands, main ground insulation surrounding the strands and tubes, and a bar end fitting of conductive material and having a first recess for receiving the extreme end portions of the conductors of one bar in a given slot and a second recess for receiving the extreme end portions of the conductors of another bar in a circumferentially spaced slot, the fitting being electrically bonded to the conductors of both said bars, said fitting having also a pair of recesses at either side of said first and second recesses respectively, the end portions of the cooling tubes being received in said respective pairs of recesses and bonded to the fitting, the fitting defining two separate passages each communicating with only one cooling tube of each bar connected to said fitting.

16. An insulated conductor bar assembly for a dynamo-electric machine comprising a plurality of conductor strands of solid cross-section disposed in thermal conductive relation with a plurality of cooling tubes, main ground insulation surrounding said bar assembly, at least one end of the bar having the extreme ends of the conductor strands and tubes bonded to a fitting of electrical conductive material, and a flared dielectric chute of electrical insulating material secured to the fitting and defining a diffusing fluid passage communicating with the open ends of said tubes whereby a gaseous coolant fluid may be circulated through the tubes.

17. In a dynamo-electric machine, the combination of an armature member having a plurality of axially extending slots, each containing a pair of radially aligned conductor bars, each bar comprising a plurality of conductor strands of solid cross-section, said strands being disposed in two parallel transversely spaced substantially radial stacks, a plurality of cooling tubes disposed longitudinally of the bar and in heat conducting relation with the conductor strands and including a radial row of tubes disposed between said stacks of strands and a comparatively wide tube disposed at either end of the stacks and extending across the width of both stacks of conductors and the intermediate row of cooling tubes, main ground insulation surrounding the bar assembly, at least one end of each bar having the extreme ends of the conductors and tubes bonded to a bar end fitting of electrical conducting material, the fitting having a spaced portion electrically bonded to similar conductors and tubes of a bar disposed in a circumferentially spaced slot of the armature, said bar end fitting defining coolant passages including an inlet chamber communicating with each of said radial row of tubes disposed intermediate the stacks of conductors and a discharge chamber communicating with each of said wide tubes disposed at either end of the stacks of conductors, the mid-portions of said cooling tubes defining intercommunicating ports whereby coolant flowing into the bar structure through said intermediate row of tubes may flow radially into said end tubes and thence to said discharge chamber.

18. In a dynamo-electric machine, a winding composed of conductor bar members each having a plurality of conductive strands insulated from one another over a major portion of the length thereof, an end fitting member disposed at either end of each bar and having coolant passages adapted to communicate with a coolant fluid supply system, the respective end portions of the strands being electrically bonded together and to said bar end fittings, at least one metal coolant tube member disposed in good heat transfer relation with the conductive strands with the tube end portions connected to the bar end fittings in communication with the coolant passages thereof, said coolant tube being formed in at least two sections connected by an insulating coupling sleeve member interrupting the electrical circuit through the coolant tube for preventing circulating currents therein.

19. In a dynamoelectric machine having a cylindrical laminated armature member with a plurality of circumferentially spaced axially extending slots, the combination of an insulated conductor bar assembly disposed in each of said slots, each bar comprising a plurality of conductor strands insulated from each other, a main insulating covering surrounding the bar assembly and insulating the conductors from the armature laminations, members defining axial fluid cooling passages disposed within said main insulating covering, each end of each bar projecting from the armature slot and having the extreme end portions of the conductor strands electrically bonded to each other and to a fitting of conductive material, said end fittings having internal coolant fluid passages communicating with the axial coolant passages in the bar, at least some of said fittings at one end of the armature member having conduit means for connecting the coolant passages in the conductor bars with an external coolant supply system, and at least some of the fittings at the other end of the laminated armature having terminal fittings for connection to an external electrical circuit.

20. In a dynamoelectric machine, the combination of a cylindrical armature member having a plurality of axially extending slots, each containing at least one conductor bar assembly comprising a plurality of members including conductor strands and surrounded by a main insulating covering, at least some of the members within said main covering defining longitudinal cooling fluid passages, means providing electrical insulation between the respective conductor strands, each end portion of each bar projecting from the ends of the armature slots and having the extreme end portions of the conductor strands electrically bonded together and to a fitting member of conductive material, the fitting having internal cooling fluid passages, and a cooling fluid supply system comprising at least two header conduits fabricated of electrically conducting material, means for supplying coolant fluid to one of said conduits, means for withdrawing spent coolant from the other of said conduits, and a plurality of branch conduit members communicating between at least some of said end fitting members and the respective header conduits, said branch conduit members having portions fabricated entirely of electrical insulating material, whereby said header conduits may be connected to any fittings to provide a desired cooling fluid circuit entirely independent of the electrical circuit defined by the conductor bars and conductive end fittings.

References Cited in the file of this patent

UNITED STATES PATENTS

| Number | Name | Date |
|---|---|---|
| 646,500 | Moody | Apr. 3, 1900 |
| 865,617 | Steinmetz | Sept. 10, 1907 |
| 1,145,612 | Porter | July 6, 1915 |
| 1,170,192 | Rudenberg | Feb. 1, 1916 |
| 1,291,459 | Field | Jan. 14, 1919 |
| 1,853,646 | Von Kando | Apr. 12, 1932 |

FOREIGN PATENTS

| Number | Country | Date |
|---|---|---|
| 172,839 | Switzerland | Feb. 1, 1935 |